(12) United States Patent
Sheehan et al.

(10) Patent No.: US 7,647,679 B2
(45) Date of Patent: Jan. 19, 2010

(54) BELT-DRIVEN INDEXING TOOL TURRET ASSEMBLY

(75) Inventors: Brian Sheehan, Elmira, NY (US); Gary Comstock, Gillett, PA (US)

(73) Assignee: Hardinge, Inc., Elmira, NY (US)

( * ) Notice: Subject to any disclaimer, the term of this patent is extended or adjusted under 35 U.S.C. 154(b) by 331 days.

(21) Appl. No.: 11/772,968

(22) Filed: Jul. 3, 2007

(65) Prior Publication Data
US 2009/0007406 A1 Jan. 8, 2009

(51) Int. Cl.
*B23B 39/20* (2006.01)
(52) U.S. Cl. ........................... 29/40; 74/813 R
(58) Field of Classification Search ............... 29/40, 29/39; 74/813 R, 814, 813 L; 82/120–121, 82/159; 144/48.1; 408/35, 128; 451/362
See application file for complete search history.

(56) References Cited

U.S. PATENT DOCUMENTS

| | | | |
|---|---|---|---|
| 3,722,644 | A | 3/1973 | Steinhagen |
| 5,641,265 | A | 6/1997 | Spada |
| 5,730,691 | A | 3/1998 | Tokura |
| 6,119,330 | A | 9/2000 | Cheng |
| 6,785,943 | B2 | 9/2004 | Sheehan |
| 2001/0039706 | A1 | 11/2001 | Sheehan |
| 2005/0132550 | A1 | 6/2005 | Matsumoto |
| 2006/0064861 | A1 | 3/2006 | Ishiguro |

FOREIGN PATENT DOCUMENTS

| | | | |
|---|---|---|---|
| DE | 3202042 | A * | 8/1983 |
| EP | 1808245 | A2 * | 7/2007 |
| GB | 2275631 | A * | 9/1994 |
| JP | 62-102906 | | 5/1987 |
| JP | 3-98791 | | 4/1991 |
| JP | 5-96403 | | 4/1993 |
| JP | 9-220624 | | 8/1997 |
| JP | 10-315014 | | 12/1998 |
| KR | 10-0655919 | B1 | 12/2006 |

OTHER PUBLICATIONS

77 USQP2d 1090, *Dorel Juvenile Group Inc.* v. *Graco Children's Products Inc.*, U.S. Court of Appeals Federal Circuit, Decided Nov. 7, 2005.*
Machine translation of DE 3202042, which published in Aug. 1983, 3 pages.*
International Search Report and Written Opinion issued on Oct. 14, 2008 in corresponding International Application No. PCT/US2008/068718.

* cited by examiner

*Primary Examiner*—Erica E Cadugan
(74) *Attorney, Agent, or Firm*—Pillsbury Winthrop Shaw Pittman LLP

(57) ABSTRACT

This invention relates to a belt drive system for a tool driving shaft of an indexing tool turret assembly. A plurality of toolholders are radially supported on a top plate assembly, which is rotatably supported on a hub connected to a turret housing. A housing is provided that supports a driven pulley connected to the tool driving shaft. A spindle motor connected to the turret housing is coupled to the live toolholder via a belt drive. The housing advantageously includes at least one removal portion that provides access to and replacement of the belt drive. Further, the tool driving shaft is supported on opposite sides of the driven pulley.

35 Claims, 7 Drawing Sheets

BELT-DRIVEN INDEXING TOOL TURRET ASSEMBLY

FIELD OF INVENTION

This invention relates to a belt drive system for a tool driving shaft of an indexing tool turret assembly, in particular, comprising a housing that supports the driven pulley of the turret.

BACKGROUND

Indexing tool turrets are used to automate the changing of rotary tools that are driven by a spindle motor. A tool turret can hold several, (e.g., a dozen or even more) separate tools and rotate to selectively align a desired tool with a driving shaft of a spindle motor. The motor connects to a driven shaft and live toolholder via gears and a clutch. In conventional turrets, there typically is not much room inside the top plate assembly for a direct drive. Therefore, many live tool drives for turrets use a transmission shaft having gears that transmit power at approximately a 90° angle to the axis of rotation of the toolholder. For example, see U.S. Pat. No. 6,785,943, herein incorporated by reference.

The present invention provides several different improvements over this known prior art.

SUMMARY OF INVENTION

One embodiment of the invention, an indexing tool turret is provided, comprising: a turret housing; a top plate assembly that supports a plurality of toolholders, the toolholders each constructed and arranged to hold a respective machining tool, the top plate assembly being rotatable with respect to the turret housing, such that one of the plurality of toolholders can be positioned in an operative position; a motor; a driven pulley that is driven by the motor; a tool driving shaft arranged to drive the toolholder that is in the operative position, the tool driving shaft being driven by the driven pulley; a belt connecting the motor to the driven pulley; and a housing for the driven pulley, the housing having a removable portion to permit access to the driven pulley.

In another embodiment of the invention, an indexing tool turret is provided, comprising: a turret housing; a top plate assembly that supports a plurality of toolholders, the toolholders each constructed and arranged to hold a respective machining tool, the top plate assembly being rotatable with respect to the turret housing, such that one of the plurality of toolholders can be positioned in an operative position; a motor; a driven pulley that is driven by the motor; a tool driving shaft arranged to drive the toolholder that is in the operative position, the tool driving shaft being driven by the driven pulley; a belt connecting the motor to the driven pulley; and a housing for the driven pulley, the housing supporting the tool driving shaft on opposite sides of the driven pulley.

Other objects, features, and advantages of one or more embodiments of the present invention will seem apparent from the following detailed description, and accompanying drawings, and the appended claims.

BRIEF DESCRIPTION OF THE DRAWINGS

Embodiments of the present invention will now be disclosed, by way of example only, with reference to the accompanying schematic drawings in which corresponding reference symbols indicate corresponding parts, in which

FIG. 3 shows various views of a housing for supporting a driven pulley as shown in FIG. 2, where:

DETAILED DESCRIPTION OF INVENTION

Figure 1:
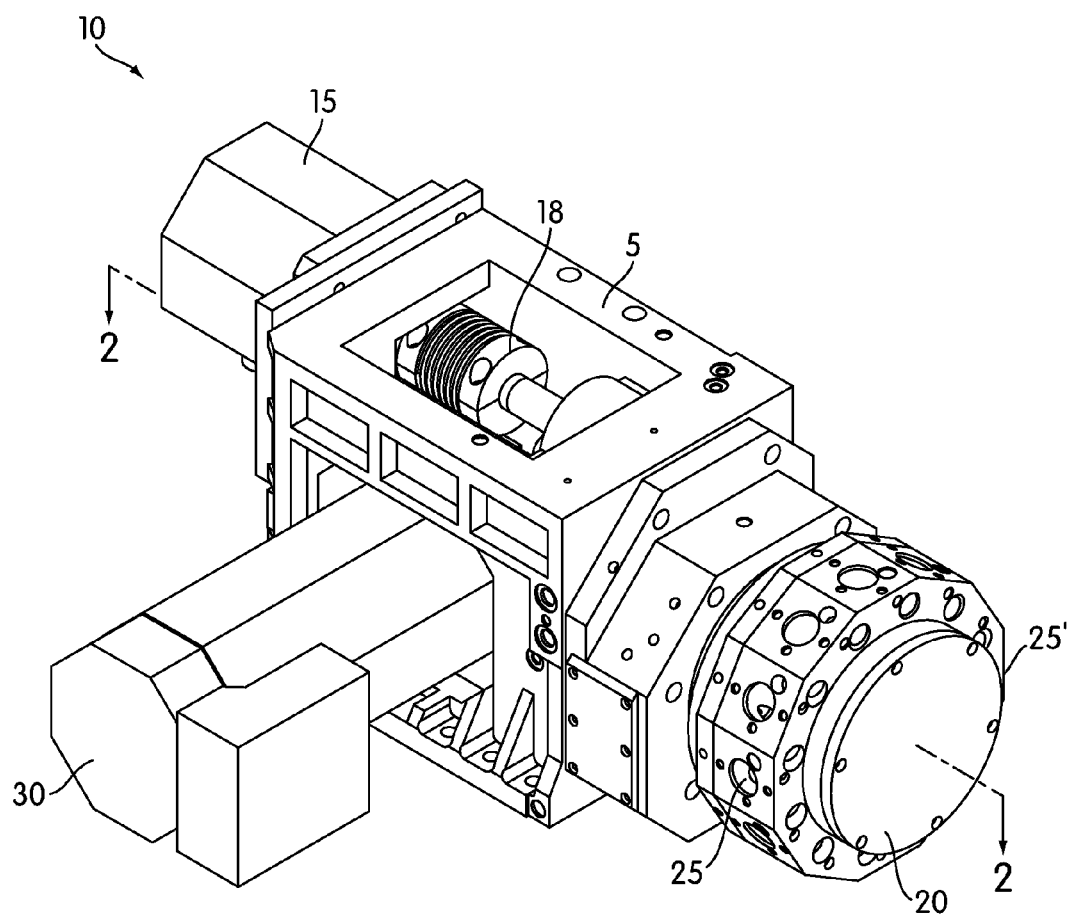
FIG. 1 shows an indexing tool turret assembly in accordance with one embodiment of the invention.

As can be seen in FIG. 1, an indexing tool turret assembly according to the present invention is generally indicated at 10. The indexing tool turret 10 includes a turret housing 5 that supports a top plate assembly 20. The turret housing 5 may be configured to conventionally mount to a machine, such as a CNC machining center.

The top plate assembly 20 includes a plurality of toolholders 25 spaced radially around the top plate assembly 20. Each toolholder 25 is configured to support and drive a desired tool T, e.g., a rotary cutting or machining tool, such as an endmill. The top plate assembly 20 is rotatable about a central axis (coincident with line 2-2) of the top plate assembly 20 with respect to the turret frame 5 by an indexing motor 15. In that regard, the top plate assembly 20 may be selectively indexed, such that one of the multiple toolholders 25 is located in an operative position, with the other toolholders 25 located in an indexing position. The toolholder 25 in the operative position may also be referred to as the live toolholder 25'. A spindle motor 30 is used to provide the rotational force to drive the live toolholder 25' and the desired tool T.

In one embodiment, both the index motor 15 and spindle motor 30 may be for example, variable speed, reversible electric motors, but other types of drive units, including hydraulic and pneumatic units may also be used.

Figure 2:
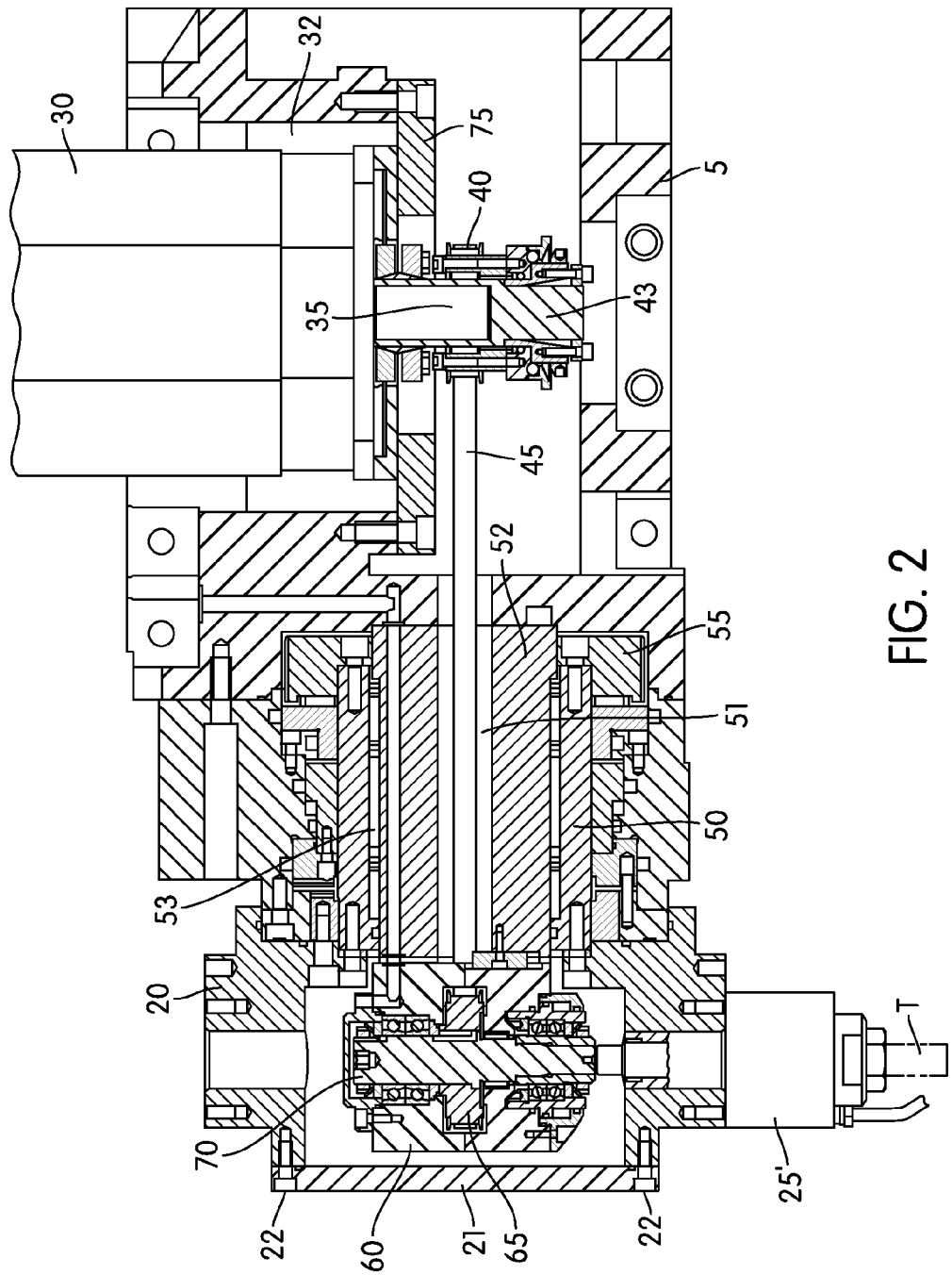
FIG. 2 shows a cross-section of the indexing tool turret assembly of FIG. 1 taken along line 2-2, in accordance with an embodiment of the invention.

FIG. 2 shows a cross-section of FIG. 1 taken along line 2-2. The top plate assembly 20 is mounted to and supported by a hub 50. In one embodiment, the hub 50 is rotationally mounted to an index bearing support 52 with bearings or bushings 53. The index bearing support 52 is mounted to the turret housing 5 by fasteners e.g., screws (not shown). This configuration allows the top plate assembly 20 to be rotationally indexed with respect to the turret housing 5. A drive gear (not shown) operatively connected to the indexing motor 15 via a coupling 18 (visible in FIG. 1), engages with a driven gear 55 attached to the hub 50 so as to rotate the top plate assembly 20 with respect to the turret housing 5.

The turret housing 5 may further be constructed with a recessed portion 32 so as to accommodate the spindle motor 30. The spindle motor 30 may be mounted on and supported by a motor mounting plate 75, which is attached to the bottom of the recessed portion 32 of the turret housing 5, for example, using fasteners. A drive pulley 40 is attached to the output shaft 35 of the spindle motor 30 and is aligned with the center of the index bearing support 52. An opening 51 in the index bearing support 52 allows a belt 45 to pass through it. In that regard, the belt 45 rotationally connects the drive pulley 40 of the spindle motor 30 to a driven pulley 65, which may be coupled to the live toolhoolder 25'. The belt 45 may be formed of rubber, polymer, or other elastomer material that may be sufficiently tensioned to effectively allow the spindle motor 30 to drive the driven pulley 65.

The drive pulley 40 may be connected to the output shaft 35 of the spindle motor 30 by a torque limiting coupling 43. The torque limiting coupling 43 protects the belt 45 from being damaged and/or broken due to excessive torque being provided by the spindle motor 30. In an overload condition, i.e., when a maximum predetermined torque is reached, the torque limiter 43 will rotationally disengage the drive pulley 40 from the output shaft 35 of the spindle motor 30, so that the belt 45 is protected from the overload. For details regarding the torque limiting coupling 43, see for example U.S. Pat. No. 3,722,644, herein incorporated by reference.

Inside the top plate assembly 20, a housing 60 surrounds the driven pulley 65 supported on a tool driving shaft 70. A cover plate 21 of the top plate assembly 20 that is attached with fasteners 22 permits access therein. The housing 60 is mounted to the index bearing support 52 while the top plate assembly 20 is mounted to hub 50 for relative rotation between the housing 60 and top plate assembly 20.

The housing 60 is may be constructed as a sub-assembly, as shown in FIG. 3. While two portions, upper and lower pieces 60A, 60B of the housing 60 are shown, any number of portions are contemplated. Access to the driven pulley 65 and also the belt 45 connected thereto, may be achieved be removing at least one portion of the housing, which may be referred to as a removable portion of the housing. The other portion of the housing may be referred to as a main portion of the housing.

Figure 3A:
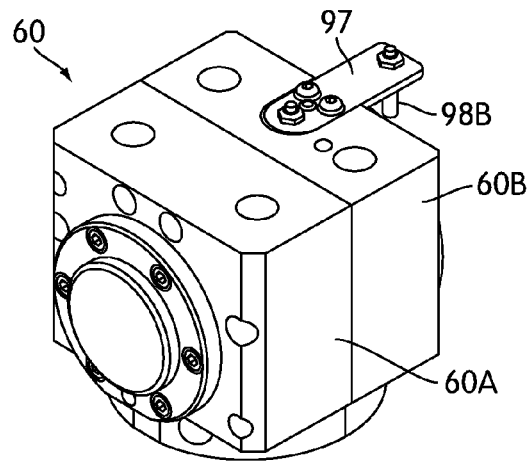
FIG. 3A shows an isometric view of the housing.
Figure 3B:
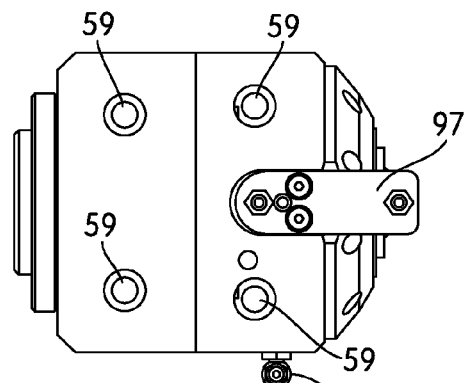
FIG. 3B shows a front elevation view of the housing.
Figure 3C:
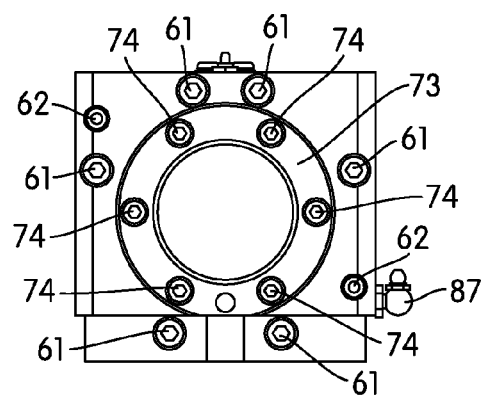
FIG. 3C shows a top plan view of the housing.

FIG. 3A shows an isometric view of housing 60. FIG. 3B shows a front elevation view of the housing 60. The housing 60 may be fastened to the index bearing support 52 by fasteners (not shown), for example four M8 bolts, to be installed in thru holes 59. The two pieces 60A, 60B of the housing 60 may be connected using fasteners 61, for example, six M6 screws. In one embodiment, the two pieces 60A, 60B of housing 60 may be aligned using two tapered dowel pins 62 prior to insertion of the fasteners 61. FIG. 3C shows a top plan view of the housing 60. An upper bearing retainer 73 is connected to the upper piece 60A of the housing 60 by fasteners 74.

Figure 3D:
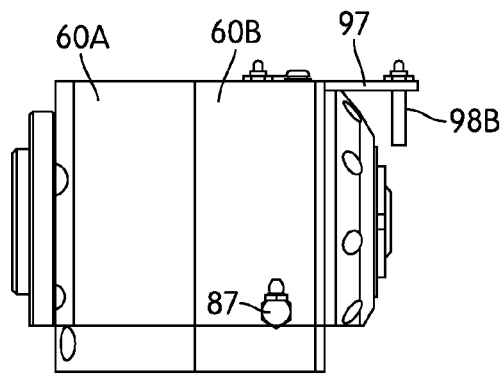
FIG. 3D shows a left side elevation view of the housing, with the right side (not shown) essentially being a mirror image thereof.
Figure 3E:
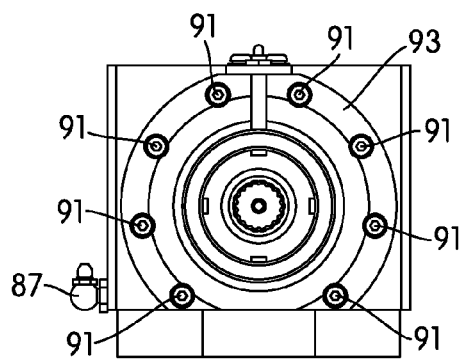
FIG. 3E shows a bottom plan view of the housing.

FIG. 3D shows a left side elevation view of the housing 60, with the right side (not shown) essentially being a mirror image thereof. FIG. 3E shows a bottom plan view of housing 60. A lower retainer 93 is connected to the lower piece 60B of the housing 60 by fasteners 91.

Figure 3F:
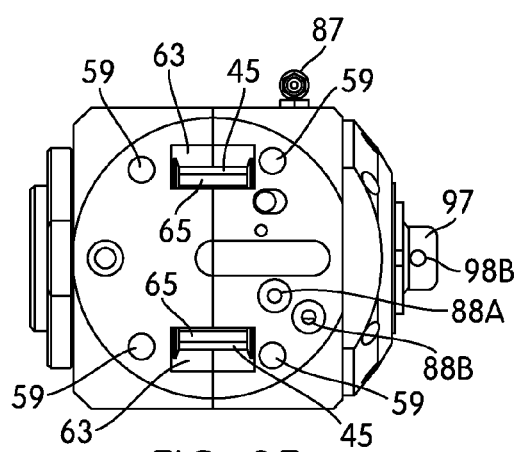
FIG. 3F shows a back elevation view of the housing.

FIG. 3F shows a back elevation view of the housing 60. Apertures 63 provide access to housing 60 for the belt 45 to pass through.

Figure 4:
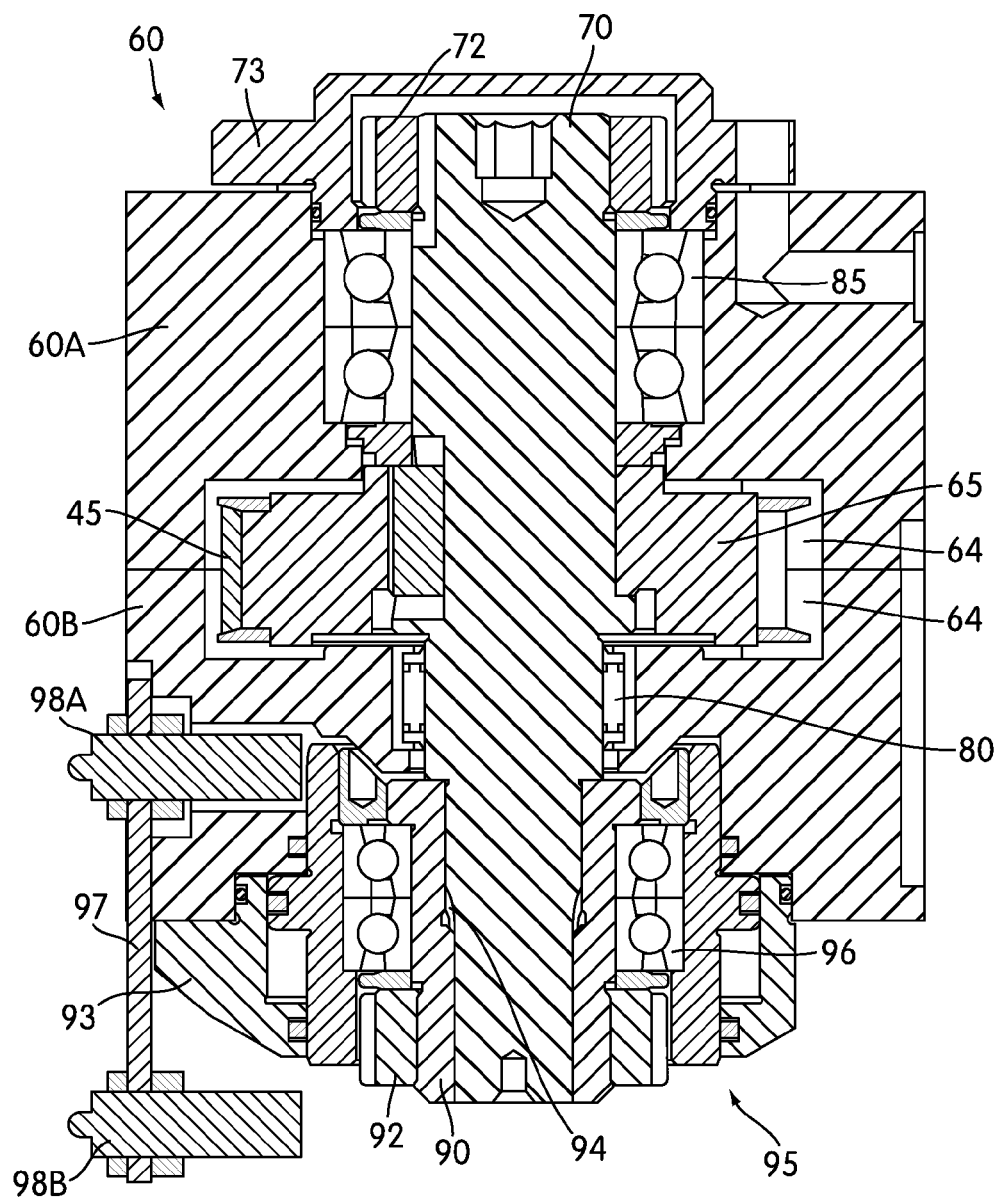
FIG. 4 shows an enlarged sectional view the housing of FIG. 3 with the live tool coupling in a disengaged position.
Figure 5:
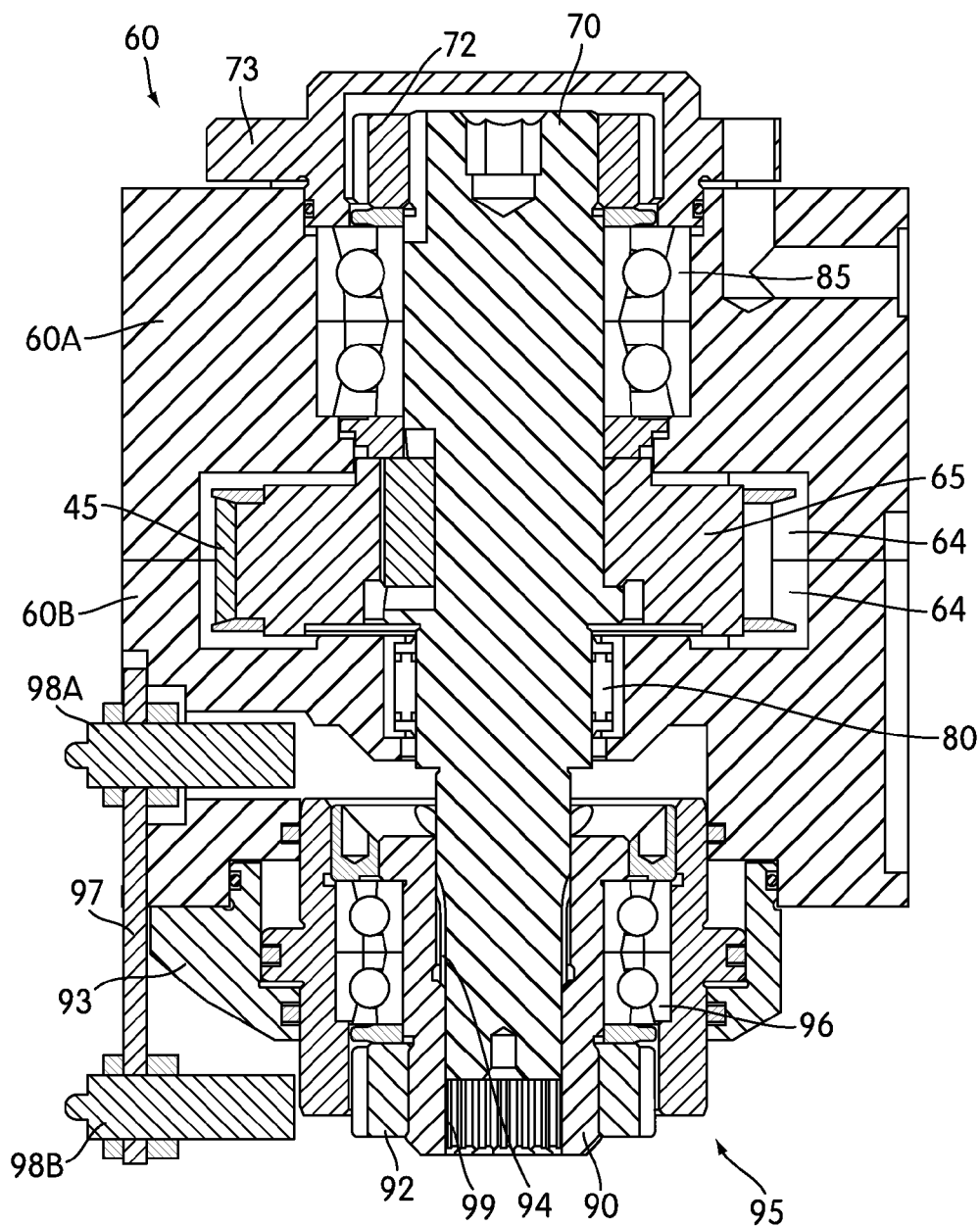
FIG. 5 shows an enlarged sectional view the housing of FIG. 3 with the live tool coupling in an engaged position.

FIGS. 4 and 5 show an enlarged sectional view of the housing 60. Upper and lower pieces 60A, 60B of the housing 60 each include a complementary recess portion 64, which provide a space to accommodate the driven pulley 65, when the housing 60 is assembled. The tool driving shaft 70 is supported by upper and lower bearing assemblies 80, 85; one located in each of the upper and lower pieces 60A, 60B of the housing 60. In one embodiment, the lower bearing assembly 80 may be a needle bearing. However, it will be appreciated that other types of bearings and/or bushings may be used for the lower bearing assembly 80.

The housing 60 provides better structural support to the driven pulley 65 and tool driving shaft 70, because the housing 60 supports the tool driving shaft 70 above and below the tensioned belt 45. The tool driving shaft 70 may be supported by the upper bearing assembly 85 and the lower bearing assembly 80 on opposite sides of the driven pulley 65. This configuration balances the forces of the driven pulley 65 and may reduce vibrations. At the same time, the housing 60 facilitates replacement of worn or broken belts 45.

The upper piece 60A of the housing 60 includes the upper bearing assembly 85 for rotationally supporting the upper end of the tool driving shaft 70. The top lock nut 72 is used to apply a preload the upper bearing assembly 85. Finally, the upper bearing assembly 85 is retained within the upper piece 60A of the housing 60 by the upper bearing retainer 73. The upper bearing retainer 73 further prevents dirt/dust from entering the upper bearing assembly 85.

The lower piece 60B of the housing 60 includes a piston assembly 95 for engaging and disengaging the live toolholder 25' with the tool driving shaft 70. A grease fitting 87 is provided on the lower piece 60B of the housing 60 for providing lubrication to the lower bearing assembly 80.

Fluid coupling ports 88A, 88B, as shown in FIG. 3F, are provided for connecting the piston assembly 95 to an external fluid pressure source (not shown), for example, a hydraulic or pneumatic source, for driving the piston assembly 95. The piston assembly 95 includes a piston bearing assembly 96 for rotationally supporting the piston, a live tool coupling 90 for engaging the live toolholder 25', a lock nut 92 for applying a preload to the piston bearing assembly 96, and the lower retainer 93 for retaining the piston assembly 95 within the lower piece 60B of the housing 60.

The live tool coupling 90 includes an external splined or keyed connection 94 to rotationally couple live tool coupling 90 with the tool driving shaft 70, while allowing the live tool coupling 90 to axially displace with respect to the tool driving shaft 70. Further, the live tool coupling 90 may be provided with an internal splined or keyed connection 99 at its lower distal end to rotationally couple the live tool coupling 90 with the live toolholder 25'. When the piston assembly 95 is engaged, as shown in FIG. 5, the live tool coupling 90 is in an extended position to engage the live toolholder 25', making the live toolholder 25' rotationally coupled to the spindle motor 30 via the internal splined or keyed connection 99. In this position, the live toolholder 25 may be used to perform a machining operation with the desire tool T, such as milling or boring. Conversely, when the piston assembly 95 is disengaged, as shown in FIG. 4, the live tool coupling 90 is in a disengaged position, so as to disengage the live toolholder 25'. In this position, the live toolholder 25' is no longer coupled to the spindle motor 30 and the top plate assembly 20 may be freely rotated. This allows for indexing of the another toolholder 25 to the operative position using the indexing motor 15.

A bracket 97 attached to the lower piece 60B of the housing 60 extends from the bottom of the housing 60 and includes first and second proximity sensors 98A, 98B. The first proximity sensor 98A is positioned and configured to detected whether the piston assembly 95 is in a retracted position, for example, as shown in FIG. 4. Similarly, the second proximity sensor 98B is positioned and configured to detected whether the piston assembly 95 is in a extended position, for example, as shown in FIG. 5. In one embodiment, the first and second proximity sensors 98A, 98B are LED sensors, however, it will be appreciated that others types of proximity sensors may also be used.

The spindle motor 30 is mounted on the spindle motor mounting plate 75, which may be provided with a coolant channel or loop 76 to dissipate heat from the spindle motor 30 and thereby discourage thermal expansion and/or contraction of the indexing tool turret assembly 10.

Figure 6:
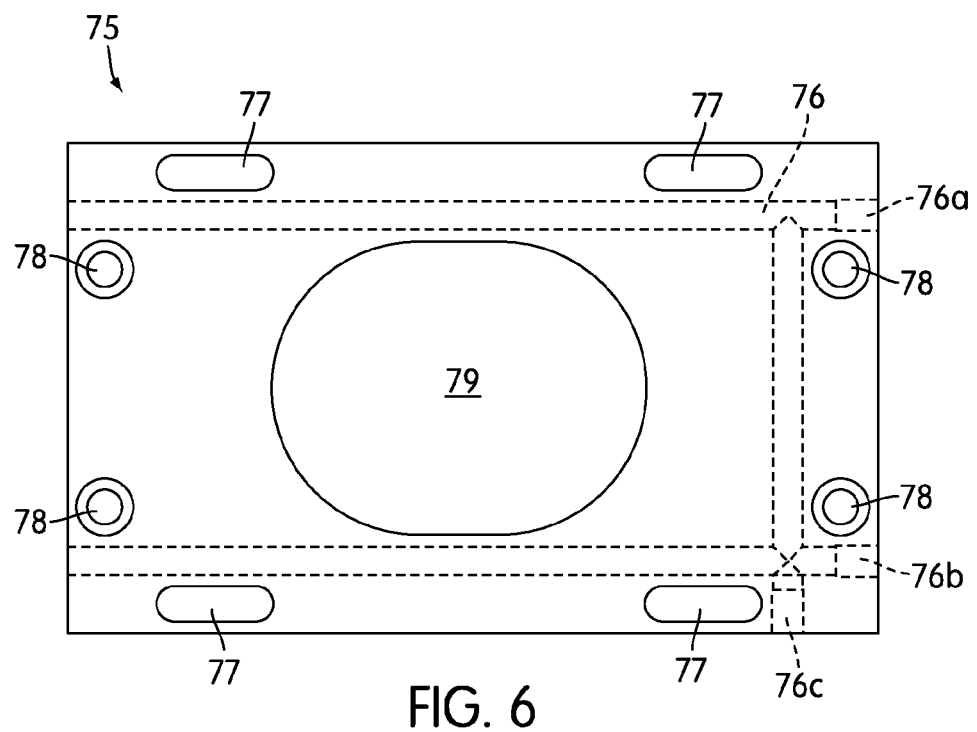
FIG. 6 shows a spindle motor mounting plate with a coolant loop formed therein, in accordance with one embodiment of the invention.

In one embodiment, the coolant loop 76 may be formed directly within the motor mounting plate 75 to reduce space, as shown in FIG. 6. An opening 79 in the motor mounting plate 75 provides an opening of sufficient size to allow the drive pulley 40 attached to the output shaft 35 of the spindle motor 30 to extend through it. Oblong motor mounting holes 77 allow the spindle motor 30 to be mounted with fasteners (not shown) to the motor mounting plate 75. The oblong motor mounting holes 77 permit the spindle motor 30 and the drive pulley 40 to be laterally shifted while the fasteners are loosely tightened, in order to apply tension to (or alternatively relieve tension of) belt 45. Further, mounting holes 78 are provided to mount the motor mounting plate 75 to the bottom of the recess 32 of the turret housing 5.

The motor mounting plate 75 may be formed of a material that conducts heat, such as a metal, in particular, aluminum or aluminum alloy. In one embodiment, the coolant loop 76 may be formed during the machining of the motor mounting plate 75. Plugs (not shown) may be then inserted into machining bores 76a, 76b, 76c and welded, threaded, or otherwise hermetically sealed in place. In other embodiments, the coolant loop 76 may be cast or otherwise formed within the motor mounting plate 75, as will be appreciated by those skilled in the art. A coolant or heat transfer fluid, for example water or a glycol, may be flowed through the coolant loop 76 to an external heat exchanger (not shown) to remove latent heat from the mounting place 75 and spindle motor 30. In alternative embodiments, the spindle motor 30 may be cooled using a jacket, sleeve, or coil, placed around the body of the spindle motor 30.

To replace a worn or broken belt 45, tension on the belt 45 is first relieved by loosening, but not necessarily removing, the fasteners for mounting the spindle motor 30 to the motor mounting plate 75. This permits the fasteners to slide laterally in the oblong motor mounting holes 77, thereby permitting the spindle motor 30 and driving pulley 40 to slide laterally within the opening 79 to relieve tension on the belt 45.

Next the cover 21 of the top plate assembly 20 may be removed by removing fasters 22 to expose the housing 60. The housing 60 is then separated from the index bearing support 52, for example, by removing fasteners from thru holes 59. Next, the upper piece 60A of the housing 60 may be removed from the housing 60 by removing fasteners 61 and tapered pins 62. With the upper piece 60A of the housing 60 removed, the driven pulley 65 and belt 45 are fully accessible. A replacement belt 45 may be installed or other maintenance performed.

The housing 60 may be reassembled and mounted to the index bearing support 52 in a reverse procedure. Finally, the belt 45 is tensioned and the fasteners for mounting the spindle motor 30 to the motor mounting plate 75 are fully tightened.

In the disclosed embodiment, the transmission shaft of the conventional tool turret assembly is not required. The housing 60 of the disclosed embodiment supports the tool driving shaft 70 from above and below the tensioned belt 45. The tool driving shaft 70 may be supported by upper bearing assembly 85 and lower bearing assembly 80 on opposite sides of the driven pulley 65. This configuration balances the forces of the driven pulley 65 and may reduce vibrations. At the same time, the construction of housing 60 may facilitate replacement of worn or broken belts 45.

While this invention has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the invention following, in general, the principles of the invention and including such departures from the present disclosure as come within known or customary practice in the art to which the invention pertains, and as may be applied to the essential features hereinbefore set forth and followed in the spirit and scope of the appended claims.

What is claimed is:

1. An indexing tool turret assembly, comprising:
   a turret housing;
   a top plate assembly that supports a plurality of toolholders, the toolholders each constructed and arranged to hold a respective machining tool, the top plate assembly being rotatable with respect to the turret housing, such that one of the plurality of toolholders can be positioned in an operative position;
   a motor;
   a driven pulley that is driven by the motor;
   a tool driving shaft arranged to drive the toolholder that is in the operative position, the tool driving shaft being driven by the driven pulley;
   a belt connecting the motor to the driven pulley; and
   a pulley housing for the driven pulley, the pulley housing located inside the top plate assembly and having a removable portion that is removably attached to another portion of the pulley housing to permit access to the driven pulley.

2. The indexing tool turret assembly according to claim 1, wherein the another portion of the pulley housing is a main portion that supports the tool driving shaft on one side of the driven pulley, and the removable portion supports the tool driving shaft on an opposite side of the driven pulley.

3. The indexing tool turret assembly according to claim 1, further comprising a live tool coupling axially displaceable with respect to the tool driving shaft allowing the tool driving shaft to be rotationally coupled to the tool holder that is in the operative position.

4. The indexing tool turret assembly according to claim 3, wherein an engagement between the live tool coupling and the tool driving shaft is a splined or keyed connection.

5. The indexing tool turret assembly according to claim 3, wherein an engagement between the live tool coupling and the toolholder in the operative position is a splined or keyed connection.

6. The indexing tool turret assembly according to claim 3, further comprising a piston assembly configured to engage and disengage the live tool coupling with the toolholder in the operative position.

7. The indexing tool turret assembly according to claim 3, further comprising at least one sensor for determining whether the live tool coupling is engaged or disengaged to the toolholder in the operative position.

8. The indexing tool turret assembly according to claim 1, wherein an output shaft of the motor comprises a drive pulley that is aligned with the driven pulley.

9. The indexing tool turret assembly according to claim 8, wherein a torque limiting coupling is provided between the output shaft of the motor and the drive pulley, so as to limit the maximum torque that may be provided to the belt.

10. The indexing tool turret assembly according to claim 1, wherein the another portion of the pulley housing is a main portion that carries a bearing assembly that supports the tool driving shaft on one side of the driven pulley, and the removable portion carries a bearing assembly that supports the tool driving shaft on an opposite side of the driven pulley.

11. The indexing tool turret assembly according to claim 1, wherein the plurality of toolholders are radially spaced around the top plate assembly.

12. The indexing tool turret assembly according to claim 1, further comprising an indexing motor configured to index the top plate assembly to locate one of the plurality of toolholders in the operative position.

13. The indexing tool turret assembly according to claim 1, further comprising a coolant loop surrounding the motor configured to dissipate heat from the motor.

14. The indexing tool turret assembly according to claim 13, wherein the coolant loop is formed in a mounting plate configured to mount the motor to the turret housing.

15. The indexing tool turret assembly according to claim 1, wherein the top plate assembly is rotatably supported on a hub connected to the turret housing.

16. The indexing tool turret assembly according to claim 1, wherein the removable portion is removably attached to the another portion of the pulley housing via releasable fasteners.

17. The indexing tool turret assembly according to claim 1, wherein the removable portion and the another portion of the pulley housing each include a complementary recess portion which together provide a space that accommodates the driven pulley.

18. An indexing tool turret assembly, comprising:
a turret housing;
a top plate assembly that supports a plurality of toolholders, the toolholders each constructed and arranged to hold a respective machining tool, the top plate assembly being rotatable with respect to the turret housing, such that one of the plurality of toolholders can be positioned in an operative position;
a motor;
a driven pulley that is driven by the motor;
a tool driving shaft arranged to drive the toolholder that is in the operative position, the tool driving shaft being driven by the driven pulley;
a belt connecting the motor to the driven pulley; and
a pulley housing for the driven pulley located inside the top plate assembly and having a removable portion that is removably attached to another portion of the pulley housing to permit access to the driven pulley, the pulley housing supporting the tool driving shaft on opposite sides of the driven pulley.

19. The indexing tool turret assembly according to claim 18, wherein the removable portion permits access to the driven pulley when removed from the another portion of the pulley housing.

20. The indexing tool turret assembly according to claim 19, wherein the another portion of the housing is a main portion that carries a bearing assembly that supports the tool driving shaft on one side of the driven pulley, and the removable portion carries a bearing assembly that supports the tool driving shaft on an opposite side of the driven pulley.

21. The indexing tool turret assembly according to claim 19, wherein the another portion of the housing is a main portion that supports the tool driving shaft on one side of the driven pulley, and the removable portion supports the tool driving shaft on an opposite side of the driven pulley.

22. The indexing tool turret assembly according to claim 18, further comprising a live tool coupling axially displaceable with respect to the tool driving shaft allowing the tool driving shaft to be rotationally coupled to the toolholder that is in the operative position.

23. The indexing tool turret assembly according to claim 22, wherein an engagement between the live tool coupling and the tool driving shaft is a splined or keyed connection.

24. The indexing tool turret assembly according to claim 22, wherein an engagement between the live tool coupling and the toolholder in the operative position is a splined or keyed connection.

25. The indexing tool turret assembly according to claim 22, further comprising a piston assembly configured to engage and disengage the live tool coupling with the toolholder in the operative position.

26. The indexing tool turret assembly according to claim 22, further comprising at least one sensor for determining whether the live tool coupling is engaged or disengaged to the toolholder in the operative position.

27. The indexing tool turret assembly according to claim 18, wherein an output shaft of the motor comprises a drive pulley that is aligned with the driven pulley.

28. The indexing tool turret assembly according to claim 27, wherein a torque limiting coupling is provided between the output shaft of the motor and the drive pulley, so as to limit the maximum torque that may be provided to the belt.

29. The indexing tool turret assembly according to claim 18, wherein the plurality of toolholders are radially spaced around the top plate assembly.

30. The indexing tool turret assembly according to claim 18, further comprising an indexing motor configured to index the top plate assembly to locate one of the plurality of toolholders in the operative position.

31. The indexing tool turret assembly according to claim 18, further comprising a coolant loop surrounding the motor configured to dissipate heat from the motor.

32. The indexing tool turret assembly according to claim 31, wherein the coolant loop is formed in a mounting plate configured to mount the motor to the turret housing.

33. The indexing tool turret assembly according to claim 18, wherein the top plate assembly is rotatably supported on a hub connected to the turret housing.

34. The indexing tool turret assembly according to claim 18, wherein the removable portion is removably attached to the another portion of the pulley housing via releasable fasteners.

35. The indexing tool turret assembly according to claim 18, wherein the removable portion and the another portion of the pulley housing each include a complementary recess portion which together provide a space that accommodates the driven pulley.

* * * * *